(12) United States Patent
Bersagel et al.

(10) Patent No.: US 12,254,280 B2
(45) Date of Patent: Mar. 18, 2025

(54) DOCUMENT CLASSIFICATION

(71) Applicant: Global Healthcare Exchange, LLC, Louisville, CO (US)

(72) Inventors: Eric Jon Bersagel, Fort Collins, CO (US); Sibi Mollykutty Luke, Kerala (IN); Alex Kallolickal Joseph, Tiruvallur (IN)

(73) Assignee: GLOBAL HEALTHCARE EXCHANGE, LLC, Lousiville, CO (US)

( * ) Notice: Subject to any disclaimer, the term of this patent is extended or adjusted under 35 U.S.C. 154(b) by 0 days.

(21) Appl. No.: 18/378,948

(22) Filed: Oct. 11, 2023

(65) Prior Publication Data
US 2024/0346257 A1 Oct. 17, 2024

(30) Foreign Application Priority Data

Apr. 12, 2023 (IN) .............................. 202311027147

(51) Int. Cl.
*G06F 16/00* (2019.01)
*G06F 40/40* (2020.01)
(52) U.S. Cl.
CPC ................................... *G06F 40/40* (2020.01)
(58) Field of Classification Search
CPC .......... G06F 3/067; G06F 16/27; G06F 3/011; G06F 3/147; G06F 40/295; G06F 40/30; G06F 11/28; G06F 16/211; G16H 40/67; G16H 20/30; A63B 22/0605; A63B 2220/51; G06N 20/00; A61B 5/222; A63F 13/35; A63F 13/60; A63F 13/69; A63F 13/792; A63F 2300/209; G06Q 10/00; G06Q 20/00; G06Q 30/00; G06Q 40/00;
(Continued)

(56) References Cited

U.S. PATENT DOCUMENTS 6,748,287 B1 6/2004 Hagen et al.
6,915,507 B1 7/2005 Kaler et al.
7,082,408 B1 7/2006 Baumann
(Continued)

FOREIGN PATENT DOCUMENTS

EP 3007113 4/2016
EP 3667602 6/2020

OTHER PUBLICATIONS

CIPO; Office Action dated Aug. 28, 2019 in CA Application No. 3047069.
(Continued)

*Primary Examiner* — Shyue Jiunn Hwa
(74) *Attorney, Agent, or Firm* — SNELL & WILMER L.L.P.

(57) ABSTRACT

The system provides the ability to understand the contextual values of an image-based document, regardless of the sender format. The system may analyze the contextual values associated with the different formats and classify the documents based on the contextual values and a business process. The system may provide filters that may be defined by the business process. The system may be adapted for different business process types, input formats and languages. The system may filter out documents that are not intended for a particular business process. The system may also create and send exemption reports about the rejected documents.

20 Claims, 2 Drawing Sheets

(58) Field of Classification Search
CPC ........ G06Q 50/00; G06Q 90/00; G06Q 99/00; H04L 1/00; H04L 5/00; H04L 9/00
See application file for complete search history.

(56) References Cited

U.S. PATENT DOCUMENTS

| | | | |
|---|---|---|---|
| 7,203,658 B1 | 4/2007 | Gidwani et al. | |
| 7,373,349 B2 | 5/2008 | O'Brien et al. | |
| 7,421,704 B2 | 9/2008 | Young | |
| 7,660,702 B2 | 2/2010 | Blight | |
| 8,190,482 B1 | 5/2012 | Federighi et al. | |
| 8,386,282 B2 | 2/2013 | Arni | |
| 8,484,662 B2 | 7/2013 | McGuire et al. | |
| 8,612,295 B2 | 12/2013 | Gidwani | |
| 8,839,222 B1 | 9/2014 | Brandwine et al. | |
| 9,239,953 B2 | 1/2016 | Esposito et al. | |
| 9,245,291 B1 | 1/2016 | Ballaro et al. | |
| 9,710,865 B1 | 7/2017 | Siemssen | |
| 9,846,691 B1 | 12/2017 | Reddy | |
| 9,871,848 B1 | 1/2018 | Shanmugam | |
| 10,031,729 B1 | 7/2018 | Totale et al. | |
| 10,540,271 B2 | 1/2020 | Cochran et al. | |
| 11,488,232 B2 | 11/2022 | Cochran et al. | |
| 11,501,253 B2 | 11/2022 | Cochran et al. | |
| 2002/0099598 A1 | 7/2002 | Eicher et al. | |
| 2002/0141660 A1 | 10/2002 | Bellavita et al. | |
| 2003/0115078 A1 | 6/2003 | Young | |
| 2003/0233551 A1 | 12/2003 | Kouznetsov et al. | |
| 2004/0015596 A1 | 1/2004 | Sapuram et al. | |
| 2004/0098663 A1 | 5/2004 | Rey et al. | |
| 2004/0128204 A1 | 7/2004 | Cihla et al. | |
| 2004/0193596 A1 | 9/2004 | Defelice et al. | |
| 2005/0096967 A1 | 5/2005 | Gerrits et al. | |
| 2005/0138019 A1 | 6/2005 | Betts et al. | |
| 2006/0090165 A1 | 4/2006 | Martin et al. | |
| 2006/0150155 A1 | 7/2006 | Blight | |
| 2006/0184522 A1 | 8/2006 | McFarland et al. | |
| 2006/0224702 A1 | 10/2006 | Schmidt et al. | |
| 2006/0242549 A1 | 10/2006 | Schwier | |
| 2007/0065011 A1 | 3/2007 | Schiehlen | |
| 2007/0168297 A1 | 7/2007 | Cheng et al. | |
| 2007/0198533 A1 | 8/2007 | Foygel et al. | |
| 2008/0021754 A1 | 1/2008 | Horn et al. | |
| 2008/0062472 A1 | 3/2008 | Garg et al. | |
| 2008/0077853 A1 | 3/2008 | Kriegesmann | |
| 2008/0091846 A1 | 4/2008 | Dang | |
| 2008/0120129 A1 | 5/2008 | Seubert | |
| 2008/0152209 A1 | 6/2008 | Kosek et al. | |
| 2008/0154957 A1 | 6/2008 | Taylor et al. | |
| 2009/0024514 A1 | 1/2009 | Kumaran et al. | |
| 2009/0030860 A1 | 1/2009 | Leitheiser | |
| 2009/0077462 A1 | 3/2009 | Kano et al. | |
| 2009/0092320 A1 | 4/2009 | Berard et al. | |
| 2009/0287845 A1 | 11/2009 | Joshi et al. | |
| 2010/0094888 A1 | 4/2010 | Schiehlen | |
| 2010/0138809 A1 | 6/2010 | Shenfield et al. | |
| 2010/0185701 A1 | 7/2010 | Ramamurthi | |
| 2011/0022439 A1 | 1/2011 | Arni | |
| 2011/0320299 A1 | 12/2011 | Gidwani | |
| 2012/0072764 A1 | 3/2012 | Narin | |
| 2012/0246515 A1 | 9/2012 | Lusenhop | |
| 2013/0117226 A1 | 5/2013 | Sandeep et al. | |
| 2013/0124354 A1 | 5/2013 | King et al. | |
| 2013/0124562 A1 | 5/2013 | Christensen | |
| 2013/0182002 A1* | 7/2013 | Macciola ................ | G06V 10/25 345/589 |
| 2014/0032427 A1 | 1/2014 | Gannon | |
| 2014/0033123 A1 | 1/2014 | Hockmann | |
| 2014/0056469 A1 | 2/2014 | Esposito et al. | |
| 2014/0092624 A1 | 4/2014 | Tsubakimoto et al. | |
| 2014/0096249 A1 | 4/2014 | Dupont et al. | |
| 2014/0173052 A1 | 6/2014 | Newton et al. | |
| 2014/0188756 A1 | 7/2014 | Ponnavaikko et al. | |
| 2015/0039359 A1 | 2/2015 | Katakol et al. | |
| 2015/0134796 A1 | 5/2015 | Theimer et al. | |
| 2015/0206099 A1 | 7/2015 | Bockx et al. | |
| 2016/0048790 A1 | 2/2016 | Ritter et al. | |
| 2016/0098340 A1 | 4/2016 | Weaver et al. | |
| 2016/0105370 A1 | 4/2016 | Mellor et al. | |
| 2016/0239770 A1 | 8/2016 | Batabyal et al. | |
| 2016/0330296 A1 | 11/2016 | Judd | |
| 2017/0046788 A1* | 2/2017 | Macciola ............. | H04N 1/3872 |
| 2017/0192774 A1 | 7/2017 | Ando | |
| 2017/0357703 A1 | 7/2017 | Theimer et al. | |
| 2020/0176098 A1* | 6/2020 | Lucas ................... | G16H 10/60 |
| 2023/0214925 A1* | 7/2023 | Cella ................... | G06Q 30/06 705/37 |

OTHER PUBLICATIONS

CIPO; Office Action dated Jul. 17, 2019 in CA Application No. 3047069.
CIPO; Notice of Allowance dated Dec. 23, 2019 in CA Application No. 3047069.
CIPO; Office Action dated Sep. 13, 2019 in CA Application No. 3047081.
CIPO; Office Action dated Sep. 3, 2019 in CA Application No. 3047071.
CIPO; Office Action dated Mar. 3, 2020 in CA Application No. 3047071.
EPO; Extended Search Report dated Aug. 5, 2019 in EP Application No. 17880242.7.
EPO; Extended Search Report dated Nov. 6, 2019 in EP Application No. 17880483.7.
EPO; Extended Search Report dated Oct. 16, 2019 in EP Application No. 17881596.5.
ISA; International Preliminary Report on Patentability dated Nov. 1, 2018 in PCT Application No. PCT/US2017/056208.
ISA; International Preliminary Report on Patentability dated Nov. 15, 2018 in PCT Application No. PCT/US2017/056214.
ISA; International Report on Patentability dated Oct. 19, 2018 in PCT Application No. PCT/US2017/056219.
ISA; International Search Report and Written Opinion dated Jan. 2, 2018 in Application No. PCT/US2017/056208.
ISA; International Search Report and Written Opinion dated Jan. 2, 2018 in Application No. PCT/US2017/056214.
ISA; International Search Report and Written Opinion dated Jan. 8, 2018 in Application No. PCT/US2017/056219.
USPTO; Non-Final Office Action dated Oct. 12, 2018 in U.S. Appl. No. 15/377,827.
USPTO; Non-Final Office Action dated Oct. 11, 2018 in U.S. Appl. No. 15/377,798.
USPTO; Non-Final Office Action dated Apr. 19, 2018 in U.S. Appl. No. 15/377,843.
USPTO; Non-Final Office Action dated Sep. 6, 2019 in U.S. Appl. No. 16/105,335.
USPTO; Notice of Allowance dated Dec. 5, 2018 in U.S. Appl. No. 15/377,827.
USPTO; Notice of Allowance dated Dec. 14, 2018 in U.S. Appl. No. 15/377,798.
USPTO; Notice of Allowance dated Aug. 13, 2018 in U.S. Appl. No. 15/377,843.
USPTO; Notice of Allowance dated Sep. 18, 2019 in U.S. Appl. No. 16/105,335.
EPO; Examination Report dated Mar. 27, 2020 in EP Application No. 17880242.7.
EPO; Extended Search Report dated May 4, 2020 in EP Application No. 20156224.6.
EPO; Extended Search Report dated May 8, 2020 in EP Application No. 20152307.3.
EPO; Examination Report dated May 29, 2020 in EP Application No. 17881596.5.
CIPO; Office Action dated Apr. 29, 2020 in CA Application No. 3047081.
CIPO; Office Action dated Jun. 26, 2020 in CA Application No. 3047071.
USPTO; Restriction Requirement dated Jun. 9, 2020 in U.S. Appl. No. 16/240,997.

(56) References Cited

OTHER PUBLICATIONS

USPTO; Non-Final Office Action dated Jul. 10, 2020 in U.S. Appl. No. 16/240,997.
USPTO; Restriction Requirement dated Jun. 18, 2020 in U.S. Appl. No. 16/241,012.
USPTO; Final Office Action dated Aug. 27, 2020 in U.S. Appl. No. 16/240,997.
USPTO; Advisory Action dated Sep. 28, 2020 in U.S. Appl. No. 16/240,997.
USPTO; Non-Final Office Action dated Sep. 14, 2020 in U.S. Appl. No. 16/241,012.
EPO; Examination Report dated Nov. 10, 2020 in EP Application No. 20152307.3.
USPTO; Final Office Action dated Nov. 2, 2020 in U.S. Appl. No. 16/241,012.
USPTO; Advisory Action dated Feb. 1, 2021 in U.S. Appl. No. 16/241,012.
USPTO; Non-Final Office Action dated Feb. 2, 2021 in U.S. Appl. No. 16/240,997.
EPO; Examination Report dated Feb. 5, 2021 in EP Application No. 20156224.6.
EPO; Summons to Attend Oral Proceedings dated Feb. 5, 2021 in EP Application No. 17881596.5.
EPO; Summons to Attend Oral Proceedings dated Feb. 16, 2021 in EP Application No. 17880242.7.
CIPO; Office Action dated Feb. 4, 2021 in CA Application No. 3065692.
IPO; Examination Report dated Feb. 8, 2021 in IN Application No. 201917024274.
USPTO; Notice of Allowance dated Feb. 24, 2021 in U.S. Appl. No. 16/240,997.
IPO; Examination Report dated Mar. 8, 2021 in IN Application No. 201917024273.
IPO; Examination Report dated Mar. 22, 2021 in IN Application No. 201917024275.
CIPO; Notice of Allowance dated Apr. 12, 2021 in CA Application No. 3065692.
CIPO; Office Action dated Apr. 20, 2021 in CA Application No. 3047071.
USPTO; Ex Parte Quayle Action dated Apr. 23, 2021 in U.S. Appl. No. 16/241,012.
USPTO; Notice of Allowance dated May 5, 2021 in U.S. Appl. No. 16/241,012.
USPTO; Non-Final Office Action dated Jan. 27, 2022 in U.S. Appl. No. 16/908,049.
CIPO; Office Action dated Mar. 30, 2022 in Canadian Application No. 3047071.
USPTO; Notice of Allowance dated Jul. 18, 2022 in U.S. Appl. No. 16/908,049.
EPO; Examination Report dated Jun. 21, 2021 in EP Application No. 17881596.5.
EPO; Examination Report dated Oct. 5, 2021 in EP Application No. 17881596.5.
EPO; Examination Report dated Dec. 22, 2021 in EP Application No. 17881596.5.
EPO; Summons to Attend Oral Proceedings dated Feb. 16, 2021 in EP Application No. 20152307.3.
USPTO; Notice of Allowance dated Jul. 7, 2022 in U.S. Appl. No. 16/897,552.
CIPO; Office Action dated Aug. 27, 2021 in Canadian Application No. 3087223.
USPTO; Non-Final Office Action dated Sep. 28, 2022 in U.S. Appl. No. 17/212,663.
USPTO; Non-Final Office Action dated Oct. 13, 2022 in U.S. Appl. No. 17/212,663.
EPO; Examination Report dated Jul. 21, 2022 in EP Application No. 20156224.6.
USPTO; Requirement for Restriction/Election Requirement dated Dec. 8, 2022 in U.S. Appl. No. 17/388,793.
EPO; European Office Action dated Sep. 27, 2021 in EP Application No. 17880483.7.
CIPO; Notice of Allowance dated Nov. 29, 2022 in Canadian Application No. 3087223.
USPTO; Non-Final Office Action dated Jan. 30, 2023 in U.S. Appl. No. 17/388,793.
USPTO; Final Office Action dated Feb. 28, 2023 in U.S. Appl. No. 17/212,663.
USPTO; Advisory Action dated May 2, 2023 in U.S. Appl. No. 17/212,663.
EPO, European Search Report dated Jan. 19, 2022, in Application No. 17880242.7.
EPO, European Office Action dated Feb. 23, 2022 in Application No. 17880242.7.
EPO, European Office Action dated Jan. 27, 2023 in Application No. 20152307.3.
CIPO; Notice of Allowance dated Jul. 13, 2020 in Canadian Application No. 3047081.
EPO, European Summons to Attend Oral Proceedings dated Oct. 6, 2021 in Application No. 2015307.3.
IPO; Examination Report dated Jul. 5, 2021 in IN Application No. 202018001420.
USPTO; Notice of Allowance dated Jun. 12, 2023 in U.S. Appl. No. 17/388,793.
USPTO; Corrected Notice of Allowance dated Jun. 22, 2023 in U.S. Appl. No. 17/388,793.
USPTO; Non-Final Office Action dated Jul. 13, 2023 in U.S. Appl. No. 17/212,663.
CIPO; Second Office Action dated Jul. 5, 2023 in Canadian Application No. 3087223.
Oracle, "Managing Business Events, Oracle Workflow Developers Guide", https://docs.oracle.com, dated Nov. 11, 2014. (Year: 2014).
Oracle, "Oracle Fusion Middleware", E29634-03, WebCenter Sites Developer's Guide, Dated Jun. 2014 (Year: 2014).
Software testing techniques , Introduction, Oracles; Sources of Oracles ED Beizer Boris, Jan. 1, 1990 (Jan. 1, 1990), Software Testing Techniques, Van Nostrand Reinhold, New York, US, pp. 23-24.
Alimadadi, Saba et al., "Understanding JavaScript Event-Based Interactions", ece.ubc.ca, dated Feb. 27, 2014 (Year: 2014).
Captiva Software Corporation, "FormWare, Universal Information Capture Software", Mar. 22, 2003.
Astera , "Data Mapping—the Foundation of System Integration", https://web.archive.org/web/20161208065617 /http://www.astera.com/solutions/technology-solutions/data-mapping/, Dated (Year: 2016), pp. 1-3.
Astera, "Empowering Data Professionals Through Intuit Software Solutions", https://web.archive.org/web/20161206175907/http://astera.com/, dated Dec. 6, 2016. (Year: 2016), pp. 1-7.
Hazelcast, http ://web .archive .org/web/20150214231829/http://hazelcast.com/products/hazelcast/, dated Feb. 14, 2015. (Year: 2015).
Anonymous: "[Server-14813] Upsert and Shard is tightly coupled, and there is no clear documentation on that—MongoDB", Sep. 22, 2015 (Sep. 22, 2015), pp. 1-2, XP055943387, Retrieved from the Internet: URL:https://web.archive.org/web/2015092217533/https://jira.mongodb.org.browse/SERVER-14813.
About These Documents: "db.collection.update()—MongoDB Manual 2.6.7", Feb. 7, 2015 (Feb. 7, 2015), pp. 1-10, XP055943388, Retrieved from the Internet: URL:https://web.archive.org/web/20150207062604/http://docs.mongodb.org/manual/reference/method/db.collection.update/.
PilotFish, "How to configure FTP/SFTP listeners", healthcare.pilotfishtechnology.com, dated Dec. 20, 2015 (Year: 2015), 15 pages.
Brennan et al, "Distributed Event Stream Processing with Non-deterministic Finite Automata", Jul. 2009, ACM, DEBS'09, pp. 1-12 ( Year: 2009).
Intellectual Property India; India Hearing Notice dated Nov. 23, 2023 in Application No. 201917024273.
Intellectual Property India; India Hearing Notice dated Jan. 1, 2024 in Application No. 201917024275.
Intellectual Property India; India Hearing Notice dated Jan. 2, 2024 in Application No. 202018001420.

(56) References Cited

OTHER PUBLICATIONS

EPO, European Office Action dated Nov. 7, 2023 in Application No. 20156224.6.
USPTO; Notice of Allowance dated Dec. 6, 2023 in U.S. Appl. No. 17/212,663.

* cited by examiner

DOCUMENT CLASSIFICATION

CROSS-REFERENCE TO RELATED APPLICATIONS

This application claims priority to, and the benefit of, India Patent Application No. 202311027147, filed Apr. 12, 2023 and titled "DOCUMENT CLASSIFICATION," which is incorporated by reference herein in its entirety for all purposes.

FIELD

This disclosure generally relates to document classification, and more particularly, to analyzing image-based documents to determine a classification for the document.

BACKGROUND

Businesses often receive image-based documents from external parties. The image-based documents may include, for example, a PDF, GIF, JPEG, etc. The businesses typically rely on humans (that are often part of data capture teams) to review each document to determine the document type (e.g., purchase order (PO)). Based on the document type, the person may store the documents, process the documents and/or route the documents to a particular address for further processing. However, some of the documents may be unrelated to the intended document processing tasks (e.g., phone message). Moreover, some of the documents may not meet a sufficient image quality standard for further processing. Furthermore, some of the documents may not include sufficient details for proper processing. Additionally, some of the documents may include personal health information, personal financial information or other data that should not be viewed by certain parties. As such, a need exists for automatically recognizing and classifying image-based documents.

SUMMARY

In various embodiments, the document classifier method comprise receiving, by a processor, a document; validating, by the processor, at least one of a sender or receiver of the document; detecting, by the processor, one or more languages in the document; assigning, by the processor, a weight to the one or more languages; determining, by the processor, that a number of pages in the document is less than a threshold number of pages; conducting, by the processor, optical character recognition (OCR) of the document; storing, by the processor, a bag of words associated with the document, based on the OCR of the document; determining, by the processor, that the document exceeds an image clarity threshold; determining, by the processor, concepts in the document; determining, by the processor, that synonyms are associated with the concepts, such that the synonyms are not separate concepts; assigning, by the processor, a weight to each of the concepts; scoring, by the processor, the document with a score based on the weight of each of the concepts and the weights of the one or more languages in the document; determining, by the processor, that the score meets a threshold; determining, by the processor, that the document lacks personal health information (PHI); determining, by the processor, that the document lacks personal credit information (PCI); determining, by the processor, that one or more rejected keywords are not in the bag of words; avoiding, by the processor, portions of the document based on an opt-out request; and classifying, by the processor, the document based on the score.

The document may be an image-based document. The assigning the weight may include combining the synonyms of each concept into the concept, then assigning the weight to the concept. The concept may include at least one of a purchase order, order date, delivery date, address, bill to, ship to, buyer, account number, purchase order table, tax information, terms, total, currency or order confirmation. The supplier may provide the rejected keywords. The classifying the document may comprise classifying the document as a purchase order. In various embodiments, the method may further comprise conducting analytics about one or more of the determining steps. The method may further comprise determining that the document includes a pre-determined format. The opt-out request may include avoiding at least one of a terms and conditions (T&C) block of text in the document or avoiding a phrase in the document. The receiving the document may further comprise using a listener to monitor for at least one of email, facsimile or web form. The method may further comprise converting the document into a PDF format. The method may further comprise detecting one or more tables in the document, wherein the classifying of the document is further based on the document containing the one or more tables. The method may further comprise determining a country of origin of the document. The method may further comprise determining a country of origin of the document based on at least one of a fax number or email address associated with the document. The method may further comprise implementing at least one of a European process or a United States process, based on the country of origin. The method may further comprise reviewing regions of the document with patterns of data related to PHI or PCI for determining that the document lacks PHI or PCI. The rejected keywords may include global keywords that are common to a plurality of buyers. The method may further comprise performing a different process on the document based on the one or more rejected keywords.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
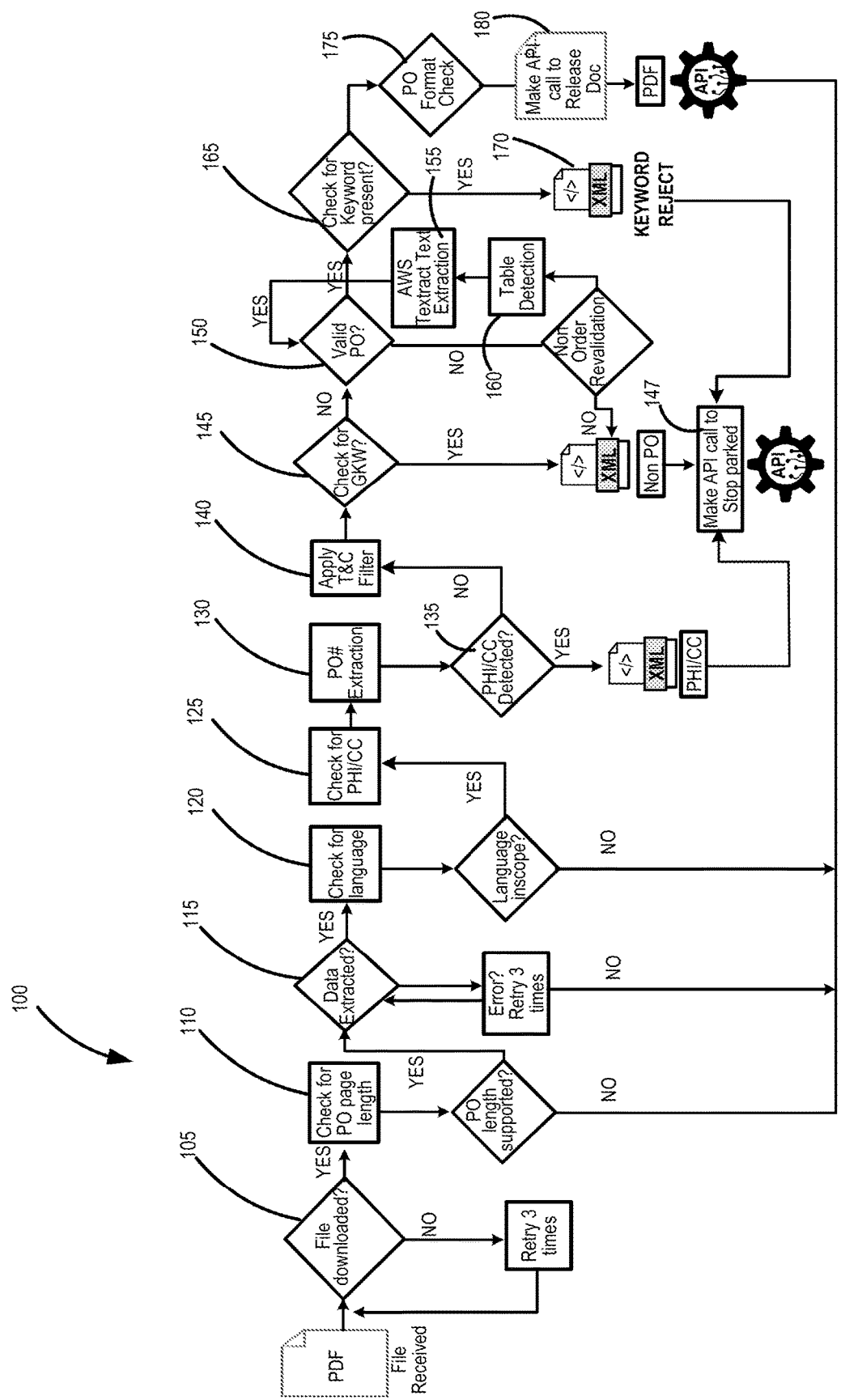
FIG. 1 is an exemplary workflow diagram for classification in the United States, according to various embodiments.

The system provides the ability to understand the contextual values of an image-based document, regardless of the sender format. For example, the system may review 20,000-30,000 documents per day in thousands of formats from over ten thousand different senders. In various embodiments, the system may analyze the contextual values associated with the different formats and classify the documents based on the contextual values and a business process. The system may provide filters that may be defined by the business process. The system may be adapted for different business process types, input formats and languages. The system may filter out documents that are not intended for a particular business process. The system may also create and send exemption reports about the rejected documents. By selecting the appropriate documents and filtering out the inappropriate documents, the system may reduce overhead, reduce the need for human intervention, improve efficiency and enhance data conversion. The system does not require machine learning training (as commonly used with synonym tables). Moreover, unlike complied code, the configuration points may be dynamic by operating in real-time. After classifying the document as a purchase order, the system may automatically send a data packet with data about the document contents to instruct a procurement system to initiate a procurement process (e.g., acquire certain goods or services) and/or an accounts receivable process (e.g., send an invoice, initiate a payment, initiate a bank transfer, initiate an ACH process, etc).

Some industries may use similar forms with low variation. The similar forms may include government forms such as a W-2 forms, real estate forms, etc. Systems may conduct OCR in the known positions (x, y coordinates for where certain data is located) or known blocks within the forms. However, many forms are very diverse and may not include known positions or known blocks, so the system may look for patterns within the document. The system may find objects in the document and determine that relevant data may be in the vicinity of those objects. For example, the system may find certain word combinations such as "purchase order" in the document, then look next to, below or across from the phrase to find the actual purchase order number. The system may use x, y coordinates to determine a region around the object for searching for the desired data.

In various embodiments, each business process may include a separate API deployment (which may be on the same cluster) and a separate configuration stack. An RPA code may communicate with the one or more API and the API may communicate with an exchange portal. For each document, the exchange portal may engage in one or more interaction with an API. The system may park a document (step 147), so the API may analyze the document. The system may determine if processing capacity exists for analyzing the document. Based upon the one or more API actions to learn about the document, the exchange portal may implement a stop or reject due to the system determining that the document is not a valid purchase order (step 150). The exchange may implement a release (step 180), if the system determines that the purchase order is a valid purchase order (step 150). The configuration stack may include, for example, DyanmoDB tables with a business process and language definition. The definition may contain, for example, concept definition, score, priority and synonyms. The configuration stack may also include configuration .ini for each API deployment that includes an opt-out and exclusionary configuration. The configuration stack may also include an infrastructure of an ECS/Docker configuration. After being deployed, each business process and language may undergo a user acceptance test phase. The user acceptance test may include analyzing production or curated data sets to tune the configuration lists. The configuration lists may be tuned by, for example, adding synonyms, changing weights, changing priorities, adding opt-in phrases, adding opt-out phrases, etc.

In various embodiments, the API may be partially or fully written in Python. The API may leverage specific open source or publicly available tools such as, for example, Pytesseract (e.g., Tesseract OCR engine tuned for specific usage), Pandas (analytics), PDFMiner (PDF reading as an alternative to image OCR for documents which can be read) and/or Polygot (language detection). The system may be deployed via AWS (Amazon Web Services) cloud infrastructure. In various embodiments, the system may include components such as, for example, elastic cluster service (docker/containers running the code in an elastic/managed cluster), DynamoDB (configuration management of the language specific business process and language combinations), AWS S3 (multiple roles, temporary file storage during classification process, common storage of system configurations) and/or AWS Textract (additional OCR engine used to double check documents that fail classification).

While not part of the API solution itself, UIPath Cloud Orchestrator and Unattended UI Path bots may interact between the originating system and the API. Such a solution may be responsible for, for example, file handling (ingress/egress between the originating system and API), API interaction (presenting documents to the API and interpreting the response), error handling (retries, error, alert if issues occur, etc), analytics interaction (relays attributes of the API responses to the analytics engine for historical logging and analysis), SLA (process completes within a set timeframe (may be set on the originating system side) and/or issues the rejection response (back to the originating system).

In general, in various embodiments, the system may identify and/or classify a document by identifying a certain number of keywords in the document (step 165). For example, if the system finds three purchase order keywords in the document, then the system determines that the document is classified as a purchase order. In various embodiments, the system may use concept, synonyms, and weighting to identify and/or classify a document. The system may also weight each factor and create a minimum qualification score that is used to determine that the document should be classified a certain way. The classification may occur within the classification API, after the document is converted to an OCR with a high enough extraction confidence score. The wordlist may include the extracted text from an OCR activity. The concept may include an attribute of a Purchase Order (PO Number, ShipTo Address, Account Number, etc.). The synonym may include a wording variation, abbreviation or acronym of a concept that may be used to link words to concepts. The weight may be a numerical value applied to a concept (which when added together combines all found attributes for the final score). The priority may include the order which concepts are searched in the wordlist. Moreover, the system may analyze each unique language. A different set of configurations may be used for each language, and each language may not have the same concepts or weighting.

Concepts may only count once, regardless of the synonyms for the concept present in the document. The concept list may be flexible such that, if a future concept is defined, the future concept may be added to the configuration with weighting and synonyms (without the need for extra computer coding). The system may also be dynamic in that, if a new synonym is found, the new synonym may be added in real-time and is picked up by the API. The synonym may be picked up by the API within 1-2 hours or immediately if re-deployed). The matched synonyms may be added to the API response to know which words caused the decision to qualify (or disqualify) the document. By re-factoring the weighting for each concept, different languages may have different scoring systems. As all concepts are dynamic, the system may be re-purposed to classify other business process types. The classification qualification score may be controlled by the API configuration.

The system may receive or acquire documents from providers, analyze the documents, filter the documents and send the filtered subset of documents to the relevant suppliers. The system may acquire hundreds of thousands of documents from over 21,000 providers that receive documents from suppliers. The providers may include entities at different service addresses that interface with customers or patients, such as healthcare systems (e.g., hospitals, clinics, caregivers, etc). The suppliers may include, for example, distributors, manufacturers, resellers, consigners, etc. that provide goods or services to the providers. The system may include providers and/or suppliers as part of a network or association that has members, wherein each member may to be part of a network so that the network handles a large number of documents each year for the members. The provider may exchange documents (e.g., in real-time) using its Enterprise Resource Planning (EPR) system, Materials Management Information System (MMIS), accounting software or billing software. Such systems may provide functionality to facilitate accounts receivable, accounts payable, inventory, demand forecasting, etc. The system may include providers and/or suppliers that are not part of a group, but may have requests for filtering a smaller number of documents each year. The supplier may provide an email or facsimile to providers, such that the providers may provide the documents to the system via email or facsimile. The provider may request that the supplier utilize a provider-specific order form.

More particularly, in various embodiments and with respect to FIG. 1, the system may download files of documents (step 105). The system may include a fax listener or email listener to monitor for incoming data and documents. The users may send documents to a particular email address. However, some users may inadvertently send different types of documents or requests to the email address, not remembering that the email should be reserved for sending in purchase order documents for processing. The system may convert the incoming data from a non-standard format (e.g., the fax format or email format) into a standardized format (e.g., a PDF format). The system may include error handling to reduce or eliminate inaccurate or problem data. The system may also confirm that all (or a sufficient amount) of the data exists in the data file, so that all data associated with the document is accurate and available. The system may also check metadata from documents against the system database to confirm that data about the document sender matches the data in the system database about the sender.

The system may call one or more APIs at one or more times to handle the functions set forth herein. For example, the system may ingest the documents via common REST-based API. The system may also interface with an exchange platform. The API may check with the exchange platform to confirm that the users are valid. The exchange platform may perform detection and/or validation of the sender/receiver using a registration lookup. The system may use the exchangeID, Dunn & Bradstreet number (DUNS), email address, phone #, and/or fax # as part of the validation process.

In various embodiments, the system may incorporate language detection (step 120). The system may incorporate Polyglot (a Python library for language detection) to detect the presence of multiple languages in text documents and/or determine which languages are present. With this library, the system includes a Python function that returns the detected languages. If the returned languages in the document are languages recognized by the system, the system may determine that the documents may be appropriate for classification. The system may classify languages such as, for example, English, German, French, and Spanish (configured in UiPath Orchestrator assets). If Polyglot identifies multiple languages recognized by the system (and on the configured list), the system includes those documents as appropriate to proceed with classification. However, the system may not proceed with documents that include two languages that may be similar to avoid confusion with the translations.

The system may count the number of pages of the document (step 110). For efficiency, the system may only process documents up to a certain number of pages (e.g., up to 10 pages). The system may then conduct an image clarity check. The image clarity check may based on the ability to conduct Optical Character Recognition (OCR). The OCR may be used to extract data into "Bag of Words" for evaluation by the system (step 115). Tesseract is an open-source OCR engine used to recognize text in images, including scanned documents and handwritten text. Tesseract analyzes the pixels of an image to identify letter and word patterns. Tesseract supports hundreds of languages. AWS Textract (a fully managed machine learning service provided by Amazon Web Services) uses OCR technology to extract text and data from scanned documents, PDFs, and other image types. AWS Textract can identify and extract information from documents with poor quality or complex layouts (including tables and forms) and supports various document formats. In various embodiments, the document may be sent to Tesseract for text extraction. If the accuracy of the extracted text is below a certain threshold, the document may be sent to AWS Textract for further extraction (step 155).

The extracted text from Textract may be used for further processing. In some cases, even with good confidence scores from Tesseract, documents may be identified as not the proper classification. In these situations, the system may use a more advanced mode of the Textract system which may use a table detection model (e.g., Cascade Tabnet) to detect tables on the document pages (step 160). The tables may indicate that the document is in fact the proper classification. If tables are present, the document may be sent for a secondary check using AWS Textract. The advanced modes may include an increased costs (which may add up quickly for a large number of documents), so the system may only use the advanced mode for documents that are more difficult to recognize.

The threshold may include a confidence score about the ability to find human-readable words in the document. The confidence score may also be associated with detectable attributes of the document such as purchase order numbers in certain types of fonts. For example, if the purchase order number is written in handwriting, then the confidence score may be low. The image confidence score may be configurable. For example, the image confidence score may be provided in a 0-100 range. In particular, the system may not process documents that are below 70 because the system concludes the document includes a bad image that most likely results in inaccurate data. If the documents are between 70 and 83, the system determines that some good data may exist in the document, so the system may provide further analysis of the document. If the documents are between 83 and 100, then the system determines that the document may include good data such that the system can properly analyze the document and recognize the data.

After the system determines that a sufficient image exists and the system obtains a bag of words from the OCR process, the system determines if the any of the words in the bag of words may match certain concepts. A concept may be a business understanding of a purchase order document. All of the concepts do not need to exist in a document to determine that the document is a purchase order. However, one or more of the concepts should exist in the document to indicate that the document includes a purchase order business context (step 130). However, most businesses and forms may include different terminology for each of the concepts. For example, Purchase_Order may have synonym patterns such as PO_num, PO_number, PO_#, P.O., PO_order, etc. In other words, the system may determine the characteristics of a purchase order and the variations of the characteristics of the purchase order, then find the characteristics and the variations in the document. The system may determine that each of the concepts also include different synonyms in the same document. Instead of counting the concepts and synonyms separately, the system may only count the concept and its synonyms as one concept. The system may then provide a weighting to that concept in the document. Exemplary concepts may be set forth in the concept list, set forth below:

| Concept | Definition | Weight |
|---|---|---|
| Purchase_Order | Indicate the document contains a purchase order document, typically via the term that indicates a PO#, OrderID, procedure date (consignment) etc. | .75 |
| Order Date | Labels showing when the Order was placed or fulfilled | 75 |
| Delivery_Date | Labels showing a requested delivery date for the product ordered | .5 |
| Address | A generic address not associated with a role (e.g., does not indicate if it is a Bill_To or Ship_To) | 5 |
| Bill_to | Keywords indicating the responsible billing (financial) party of the PO request | 5 |
| Ship_To | Keywords indicating the destination (delivery) party of the PO Request | 5 |
| Buyer | Indicates the individual/system requesting the Purchase | 5 |
| Account_Number | Indicates the requesting customers account information (ID) within the requested supplier system, which confirms the customer is registered with the supplier | .75 |
| PO_Table | Typically found in a table of goods requested for purchase. The table may include an attribute header for the goods (quantity, price, description, part number, batch number, serial number, unit of measure, etc) | 1 |
| Tax_Info | Identification of tax identification (e.g., VAT number in Europe) used to build a business relationship between buyer and seller. Allows the system to identify the entity. | 5 |
| Terms | Identification of Payment terms provided by the seller for when the buyer is required to send the payment to the seller (i.e., Net30) | 5 |
| Total | Identification of the financial commitment from the buyer to seller | .75 |
| Currency | Identification of the currency used to settle the transaction, particularly between parties in different countries | .5 |
| Order_confirmation | How to confirm an order received by the seller, how to notify the parties of the shipment, order comments, shipper identification information (e.g., FedEx identifier) | .5 |

The system may now have obtained the words, matched the synonyms to the concepts, and counted the unique concepts that have been found, so the system then applies a weighting factor to each of the unique concepts. The system may use the phrase "unique concepts" to highlight that similar concepts and/or synonyms for those concepts may not be separately counted. PO_Table may have the highest weighting, while Purchase_Order and Account_Number may also include higher weightings. Moreover, each of the languages may have a weight cut-off score. Documents from certain countries and/or certain languages may include more errant symbols or lines, such that those languages may be more difficult to interpret, so those languages may have a lower qualification score.

The system adds all of the weighted values from each of the concepts in the document to obtain a secondary PO classification score. If the secondary PO classification score is higher than a threshold amount, then the system determines that a document is a purchase order. If the secondary PO classification score is lower than a threshold amount, then the system determines that the document does not contain the attributes of a purchase order and the system considers the document an exception. For example, the exception documents may include phone messages, emails, advertisements, status requests, tax request forms, specification documents, etc. The exception document is not sent to the processors that handle the processing of the purchase orders. The exception documents may include about 9-10% of the total documents submitted into the system. The API may determine that the document is an exemption, so the API notifies the exchange portal. The exchange portal may execute an exemption report which may include an email to the supplier that explains that the document could not be processed as a purchase order.

In various embodiments, the system may determine a country of origin for the document. The country of origin may be determined from the fax number or email address because the system may have a look up table or other database that associates a user's fax number or email address with the country of origin of the user. Using an API call, the system may determine that the country of origin is the European Union and activate a European protocol or processing steps for the document from the European user, as set forth in FIG. 2. Similarly, using an API call, the system may determine that the country of origin is the United States and activate a United States protocol or processing steps for the document from the United States user, as set forth in FIG. 1. However, the system contemplates that any of the functions and features of the European and United States processes may be interchanged, excluded or added to each process.

In various embodiments, the system may use the bag of words to search documents for personal health information, patient sensitive information, or other sensitive health information that may be restricted from others (step 125). The system may look for patterns of data, then the system determines if the user entered additional data within the region of the patterns of data. The patterns of data may include words that are typically used to request PHI such as, for example, "provide your symptoms", "provide your medical history", etc. As set forth in FIG. 1, the system (e.g., as operating in the United States) may find and reject documents with such sensitive information (step 135). The system may also implement an API to indicate that the rejection of the document is due to the document containing PHI, so the system may hide or restrict the document with the PHI from being accessed or viewed.

Figure 2:
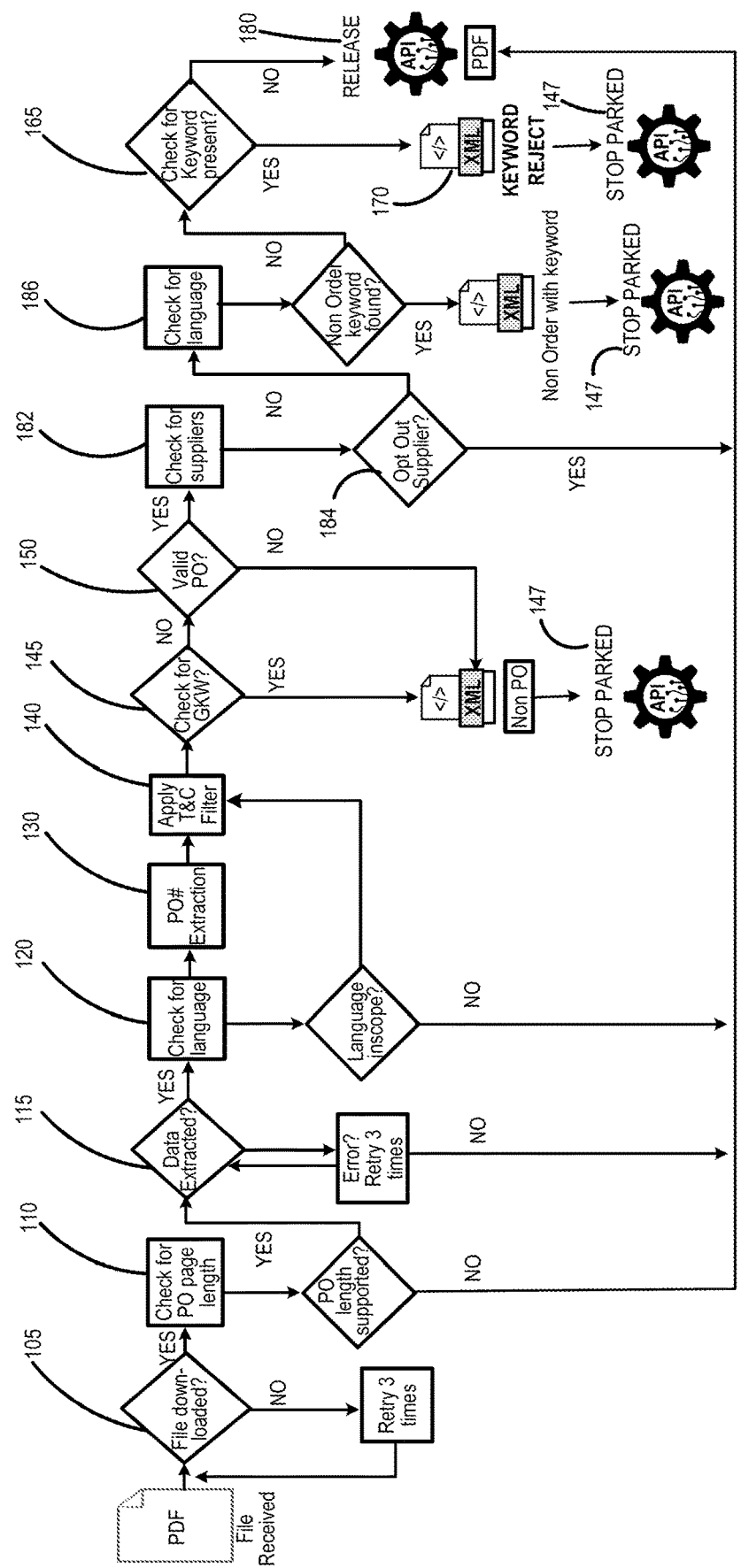
FIG. 2 is an exemplary workflow diagram for classification in the European Union, according to various embodiments.

As set forth in FIG. 2, in various embodiments, European customers may be more aware or trained about not sending documents with such sensitive information, so the system in the European Union may not similarly search for or find such sensitive information to reject when receiving documents in the European Union. Instead, the system in the European Union may only flag documents with such sensitive information. As such, the European Union system may not reject documents with such sensitive information. In other countries, the system may accept documents with such sensitive information, but the system may not display the documents to the users. In various embodiments, the system may redact part of the documents having the sensitive information.

In various embodiments, the system may also use the bag of words to search documents for financial information or other sensitive information such as, for example, personal credit information, credit card information, CVV codes, ACH details, etc (step 125). The system may look for patterns of data, then the system determines if the user entered additional data within the region of the patterns of data. The patterns of data may include words that are typically used to request financial information such as, for example, "provide your credit card", "what is your CVV number", etc. As set forth in FIG. 1, the system may find and reject documents with such sensitive information. The system may also implement an API to indicate that the rejection of the document is due to the document containing financial information, so the system may hide or restrict the document with the financial information from being accessed or viewed (step 135). To further catch the financial information that may be entered in other areas of the document, the system may find patterns of numbers that may indicate that the patterns of numbers resemble a credit card number.

The system may have determined the documents that met certain image quality thresholds, the system may have removed documents that the system may have determined are not purchase orders, and the system may have removed documents that contain PHI, sensitive information or financial information, based on the methods discussed herein. In various embodiments, for the remaining documents that the system determines may be valid purchase orders (step 150), the system may perform keyword rejection on those purchase orders (step 170). The keyword rejections may be based on words associated with the arrangement between the supplier and the provider. For example, a consignment is sold between a supplier and a provider on a real-time basis. More particularly, the supplier may be on the provider's site, so the supplier provides goods to the provider, then the supplier bills the provider for the goods at a later time. A replenish type consignment system involves the supplier maintaining a stock of items at the provider site, such that the provider may use items from the stock of items at any time. The supplier then replenishes the stock of items and bills the provider for the used items at a later time.

The system may use global keywords (step 145) or receive rejection keywords from the suppliers. The system may check for suppliers (step 182) and determine if the supplier opted out of providing rejection keywords (step 184). If the supplier opted-in to supplying rejection keywords, the system checks for rejection keywords that indicate the document is not a purchase order (step 186). The global keywords may relate to common keywords that may be used by many suppliers. The system may analyze conversational patterns (e.g., using fuzzy logic) to determine if such keywords exist. For example, a supplier may provide a purchase order attachment to an email, but the email is asking about a status of an order. As such, the system may use the global keyword of "status" to exempt certain communications from consideration. However, the system may check the attached purchase order to determine that the purchase order includes an appropriate purchase order number (step 150). The system may determine that the purchase order should still be considered, even if the email is exempted. Such supplier supplied rejection keywords may include, for example, "bill only", "replenish", "consign", "trunk stock", "consignment", part number, lot number, Veteran's Administration hospital indicator, etc. The system may also include any non-standard delivery frequency requests as part of the keyword rejections because such orders may need to be handled outside of the typical purchase order process. Such non-standard delivery frequencies may include, for example, overnight delivery, courier, drop ship, etc.

The system may obtain the bag of words related to the document. The system may also use an API to provide a request containing the supplier information related to the document. The system uses the supplier information to obtain any rejection keywords that may be associated with the supplier information. The system may then determine if any of the words in the bag of words includes any of the rejection keywords associated with the supplier. In various embodiments, the system may review the rejection words in the order that the supplier provided the rejection keywords. As such, the system may not assign any priority or weight to particular rejection keywords. The system may perform a different process on the document based on the first rejection keyword that matches one of the words in the bag of words from the document. In other words, the system does not need to find multiple rejection keywords in the document. If the document contains one or more of the rejection keywords (or words similar to the rejection keywords), the system may perform a different process on the document. One of the processes may include, for example, rejection of the document.

To save on processing power and time, the system may ignore searching the "Terms and Conditions" (T&C) in the document for any of the rejection keywords (step 140). In various embodiments, the system may include a "Terms and Conditions" (T&C) checker. To prevent or minimize the false positives, in the DefaultPatternList.ini file, the system configures keywords to identify T&C blocks. The system may check for terms and/or conditions to eliminate or reduce any extraneous text from the OCR results. Removal of the extraneous text allows the keyword rejection check to only apply to relevant text. If the T&Cs are not removed, the possibility of false positive keyword identification arising from the T&C section increases. The system may identify implicit T&Cs that may be incorporated into the main areas of the purchase order (the main area is where other business terms may be located). The system may avoid searching a block of text that contains the T&Cs. The system may identify explicit T&Cs that may be located after the end of the business terms section. For example, the system may determine that the business terms section may end after phrases such as "Order Total", "Total," and "Summary Total" etc. If the OCR result text contains any of these keywords, the system may truncate the extracted text after that point. The system may also use the remaining block for keyword rejection scenarios.

As part of an opt-out procedure, in various embodiments, the system may also include a T&C ignore block and/or a phrase ignore block, which specifies keywords that may be temporarily excluded from the bag of words. As such, the system may perform certain word checks with a subset of the bag of words. Such ignored phrases may include, for example, "For bill only requests . . . " or "Copyright 2022. All Rights Reserved".

In various embodiments, the system may provide classification and rejection outputs. The system may provide an exemption report that states that the document was rejected based on a particular reason. The exemption reason may include a rejection keyword that matched a word in the document, PHI existing in the document, financial information existing in the document, etc.

In various embodiments, the system may log and/or aggregate any of the analytics about the activities of the system. For example, for any of the API calls, the system may log the output metadata to a data repository. The system may use the data depository and an analytics engine to monitor the actions and determine trends. The system may determine how many documents the system processed during a first time period compared to a second time period. The system may measure the behavior of individual transactions, overall system behavior, overall system efficiency, etc. The analytics may help determine if the system should add more or less capacity. The analytics may help determine commonality (e.g., in PO numbers, etc). The system may also determine return on investment. For example, for each document that the system exempts from the system, the system may save $0.18 USD and $0.19 Euro cents in extra processing expenses.

In various embodiments, the system may include document format identification (step 175). 45% of the documents may include known formats (or similar formats). Certain suppliers may provide a rebate, savings or discount if the provider uses a purchase order having a known format acceptable to the supplier. Moreover, many suppliers are using cloud based or centralized solutions, so many of the suppliers are using similar templates. The format identification may be performed on documents that have been determined to meet various thresholds. The system may reduce the need for human review of the documents by predicting the format of the document. The system may use known formats which may include formats on the larger number of documents received by the system. The system may use observed characteristics to determine if the qualified documents match known patterns which can be sent to a downstream full document conversion solution. The system may use data to help determine if the document follows a certain template. For example, the system may use data about how many times the documents were rejected, the clarity of the image, the amount of data extracted, the score of the document etc.

In various embodiments, after the document (e.g., purchase order) is verified, the system may send a signal to an accounting system, procurement system and/or inventory system to allow the provider to obtain the goods or services from the supplier. The system may generate an authorized purchase message to send to a portal (e.g., a kiosk, a gate, a locker, an area, etc.). The portal may activate a motor, a door and/or a lever to allow the provider access to retrieve a purchased item and/or leave an area with the purchased item. The authorized purchase message may include the purchase order number, purchase order data, transaction number, the timestamp, the currency type, the amount, the transaction code, the transaction type, the description, provider ID, supplier ID, product IDs, a portal ID, and/or the like. The system may then transmit the authorized purchase message to the portal. The portal may verify certain data in the authorized purchase message, and based on the verification, the portal may grant the customer access to the purchased item. In various embodiments, access to the portal may include opening a door, lifting a gate, providing access to an area, displaying a product, rotating a platform, dispensing a product and/or causing other mechanical or physical access that allows the provider to take the purchased item and/or leave the inventory area.

The system may include remote access to data, standardizing data and allowing remote users to share information in real time. The system may allow users to access data (e.g., data from purchase orders, etc.), and receive updated data in real time from other users. The system may store the data (e.g., in a non-standardized format) in a plurality of storage devices, provide remote access over a network so that users may update the data that was in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. The system may allow remote users to share data in real time in a standardized format, regardless of the format (e.g., non-standardized) that the information was input by the user.

The system may include a filtering tool that is remote from the end user and provides customizable filtering features to each end user. The system may also include a filtering tool that is remote from the end user and provides customizable filtering features to each end user. The filtering tool may provide customizable filtering by filtering access to the data. The filtering tool may identify data or accounts that communicate with the server and may associate a request for content with the individual account. The system may include a filter on a local computer and a filter on a server. The filtering tool may identify information or accounts that communicate with the server, and associate a request for content with the individual account. The system may include a filter on a local computer and a filter on a server.

The system may store elements from different host websites in a database, then when a user accesses the database, the system may provide a hybrid webpage that merges content or documents from the different host websites. Upon access, the system may merge the content from the various websites and provide a link to the user to access the merged data in the form of an image-based document.

The system may train a neural network when using artificial intelligence or machine learning. The system may include an expanded data set of past data to train the neural network. The expanded training set may be developed by applying mathematical algorithms to the acquired set of data. The neural network is then trained with the expanded data set using a machine learning algorithm that uses a mathematical function to adjust certain weighting. The system may also use an iterative training algorithm to re-train with additional data.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. An individual component may be comprised of two or more smaller components that may provide a similar functionality as the individual component. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The system may allow users to access data, and receive updated data in real time from other users. The system may store the data (e.g., in a standardized format) in a plurality of storage devices, provide remote access over a network so that users may update the data in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. The system allows remote users to share data in real time in a standardized format, regardless of the format (e.g., non-standardized) that the information was input by the user. The system may also include a filtering tool that is remote from the end user and provides customizable filtering features to each end user. The filtering tool may provide customizable filtering by filtering access to the data. The filtering tool may identify data or accounts that communicate with the server and may associate a request for content with the individual account. The system may include a filter on a local computer and a filter on a server.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodically, randomly, once, more than once, or in response to a suitable request or action. Any of the information may be distributed and/or accessed via a software enabled link, wherein the link may be sent via an email, text, post, social network input, and/or any other method.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements, but also to the various system components as described herein. It should be understood that, although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PUP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components may be contemplated. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMA- ZON ECHO DOT®, AMAZON TAP®, and AMAZON FIRE® TV, have access to the ALEXA® system. The ALEXA® system, GOOGLE HOME® system, and HOME-POD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOME-POD® systems may also allow the user to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices. The AI or ML may store data in a decision tree in a novel way.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through various data association techniques. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet may be contemplated.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

The particular blockchain implementation described herein provides improvements over technology by using a decentralized database and improved processing environments. In particular, the blockchain implementation improves computer performance by, for example, leveraging decentralized resources (e.g., lower latency). The distributed computational resources improves computer performance by, for example, reducing processing times. Furthermore, the distributed computational resources improves computer performance by improving security using, for example, cryptographic protocols.

The invention claimed is:

1. A method comprising:
   detecting, by one or more processors, one or more languages from different countries in a document;
   assigning, by the one or more processors, a weight to the one or more languages from different countries;
   determining, by the one or more processors, document content concepts in the document from a bag of words associated with the document, wherein the document content concepts include an attribute of a type of document;
   determining, by the one or more processors, that synonyms are associated with the document content concepts, wherein the synonyms include at least one of a wording variation, abbreviation or acronym of the document content concepts that is used to link the synonyms to the document content concepts;
   linking, by the one or more processors, the synonyms to the document content concepts;
   assigning, by the one or more processors, a weight to each of the document content concepts, wherein the document content concepts include the synonyms to the respective document content concepts;
   scoring, by the one or more processors, the document with a classification score based on the weight of each of the document content concepts and the weights of the one or more languages from different countries in the document;
   determining, by the one or more processors, that the classification score meets a threshold;
   determining, by the one or more processors, a pattern in the document;
   determining, by the one or more processors, an object within the pattern in the document;
   creating, by the one or more processors, a region around the object using x-y coordinates;
   searching, by the one or more processors, in the region for data relevant to the object;
   determining, by the processor, that the document lacks personal health information;
   determining, by the processor, that the document lacks personal credit information;
   determining, by the one or more processors, that one or more rejected keywords are not in the bag of words;
   avoiding, by the one or more processors, portions of the document based on an opt-out request;
   classifying, by the one or more processors, the document based on the classification score; and
   assigning, by the one or more processors, and based on the classifying, the document to at least one of a release report in response to the document being a valid document or an exemption report in response to the document being a rejected document.

2. The method of claim 1, further comprising at least one of:
   receiving, by a processor, the document;
   validating, by the processor, at least one of a sender or a receiver of the document;
   determining, by the processor, that a number of pages in the document is less than a threshold number of pages;
   conducting, by the processor, optical character recognition (OCR) of the document;
   storing, by the one or more processors, the bag of words associated with the document, based on the OCR of the document; or
   determining, by the processor, that the document exceeds an image clarity threshold.

3. The method of claim 1, wherein the assigning the weight includes combining the synonyms of each document content concept into the document content concept, then assigning the weight to the document content concept.

4. The method of claim 1, wherein the document content concept includes at least one of a purchase order, order date, delivery date, address, bill to, ship to, buyer, account number, purchase order table, tax information, terms, total, currency or order confirmation.

5. The method of claim 1, wherein the supplier provides the rejected keywords.

6. The method of claim 1, further comprising sending, by the one or more processors, a data packet with data about contents of the document to at least one of a procurement system to initiate a procurement process or an accounts receivable system to initiate an accounts receivable process.

7. The method of claim 1, further comprising conducting, by the one or more processors, analytics about one or more of the determining steps.

8. The method of claim 1, further comprising determining, by the one or more processors, that the document includes a pre-determined format.

9. The method of claim 1, wherein the opt-out request includes avoiding at least one of a terms and conditions (T&C) block of text in the document or avoiding a phrase in the document.

10. The method of claim 1, wherein the receiving the document further comprises using a listener to monitor for at least one of email, facsimile or web form.

11. The method of claim 1, further comprising converting, by the one or more processors, the document into a PDF format.

12. The method of claim 1, further comprising detecting, by the one or more processors, one or more tables in the document, wherein the classifying of the document is further based on the document containing the one or more tables.

13. The method of claim 1, further comprising determining, by the one or more processors, a country of origin of the document.

14. The method of claim 1, further comprising determining, by the one or more processors, a country of origin of the document based on at least one of a fax number or email address associated with the document.

15. The method of claim 13, further comprising implementing, by the one or more processors, at least one of a European process or a United States process, based on the country of origin.

16. The method of claim 1, further comprising reviewing, by the one or more processors, regions of the document with patterns of data related to at least one of the personal health information or the personal credit information for the determining that the document lacks at least one of the personal health information or the personal credit information.

17. The method of claim 1, wherein the rejected keywords include global keywords that are common to a plurality of buyers.

18. The method of claim 1, further comprising performing, by the one or more processors, a different process on the document based on the one or more rejected keywords.

19. An article of manufacture including one or more non-transitory, tangible computer readable storage mediums having instructions stored thereon that, in response to execution by one or more processors, cause the one or more processors to perform operations comprising:
  detecting, by the one or more processors, one or more languages from different countries in a document;
  assigning, by the one or more processors, a weight to the one or more languages from different countries;
  determining, by the one or more processors, document content concepts in the document from a bag of words associated with the document, wherein the document content concepts include an attribute of a type of document;
  determining, by the one or more processors, that synonyms are associated with the document content concepts, wherein the synonyms include at least one of a wording variation, abbreviation or acronym of the document content concepts that is used to link the synonyms to the document content concepts;
  linking, by the one or more processors, the synonyms to the document content concepts;
  assigning, by the one or more processors, a weight to each of the document content concepts, wherein the document content concepts include the synonyms to the respective document content concepts;
  scoring, by the one or more processors, the document with a classification score based on the weight of each of the document content concepts and the weights of the one or more languages from different countries in the document;
  determining, by the one or more processors, that the classification score meets a threshold;
  determining, by the one or more processors, a pattern in the document;
  determining, by the one or more processors, an object within the pattern in the document;
  creating, by the one or more processors, a region around the object using x-y coordinates;
  searching, by the one or more processors, in the region for data relevant to the object;
  determining, by the processor, that the document lacks personal health information;
  determining, by the processor, that the document lacks personal credit information;
  determining, by the one or more processors, that one or more rejected keywords are not in the bag of words;
  avoiding, by the one or more processors, portions of the document based on an opt-out request;
  classifying, by the one or more processors, the document based on the classification score; and
  assigning, by the one or more processors, and based on the classifying, the document to at least one of a release report in response to the document being a valid document or an exemption report in response to the document being a rejected document.

20. A system comprising:
  one or more processors; and
  one or more tangible, non-transitory memories configured to communicate with the one or more processors,
  the one or more tangible, non-transitory memories having instructions stored thereon that, in response to execution by the one or more processors, cause the one or more processors to perform operations comprising:
  detecting, by the one or more processors, one or more languages from different countries in a document;
  assigning, by the one or more processors, a weight to the one or more languages from different countries;
  determining, by the one or more processors, document content concepts in the document from a bag of words associated with the document, wherein the document content concepts include an attribute of a type of document;
  determining, by the one or more processors, that synonyms are associated with the document content concepts, wherein the synonyms include at least one of a wording variation, abbreviation or acronym of the document content concepts that is used to link the synonyms to the document content concepts;
  linking, by the one or more processors, the synonyms to the document content concepts;
  assigning, by the one or more processors, a weight to each of the document content concepts, wherein the document content concepts include the synonyms to the respective document content concepts;
  scoring, by the one or more processors, the document with a classification score based on the weight of each of the document content concepts and the weights of the one or more languages from different countries in the document;
  determining, by the one or more processors, that the classification score meets a threshold;
  determining, by the one or more processors, a pattern in the document;
  determining, by the one or more processors, an object within the pattern in the document;
  creating, by the one or more processors, a region around the object using x-y coordinates;
  searching, by the one or more processors, in the region for data relevant to the object;
  determining, by the processor, that the document lacks personal health information;
  determining, by the processor, that the document lacks personal credit information;
  determining, by the one or more processors, that one or more rejected keywords are not in the bag of words;
  avoiding, by the one or more processors, portions of the document based on an opt-out request;
  classifying, by the one or more processors, the document based on the classification score; and
  assigning, by the one or more processors, and based on the classifying, the document to at least one of a release report in response to the document being a valid document or an exemption report in response to the document being a rejected document.

* * * * *